United States Patent
Wahlberg et al.

(10) Patent No.: US 6,799,048 B2
(45) Date of Patent: Sep. 28, 2004

(54) MOBILE POSITIONING WITHIN AN AMPS/TDMA SYSTEM

(75) Inventors: Joachim Wahlberg, Ronneby (SE); Lars Novak, Ronneby (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 686 days.

(21) Appl. No.: 09/728,213

(22) Filed: Nov. 30, 2000

(65) Prior Publication Data

US 2002/0065085 A1 May 30, 2002

(51) Int. Cl.⁷ ................................................. H04Q 7/20
(52) U.S. Cl. .......................... 455/456.1; 455/432.1; 455/433; 455/445; 455/417
(58) Field of Search ............................ 455/433, 456.1, 455/456.2, 456.3, 404.2, 417, 432.1, 461, 445; 379/221.01, 221.09, 221.13, 221.14

(56) References Cited

U.S. PATENT DOCUMENTS

| | | | | |
|---|---|---|---|---|
| 5,930,699 A | * | 7/1999 | Bhatia | 455/456.3 |
| 6,151,498 A | | 11/2000 | Roel-Ng et al. | 455/433 |
| 6,191,738 B1 | * | 2/2001 | Pfeil et al. | 342/457 |
| 6,560,462 B1 | * | 5/2003 | Ravi et al. | 455/456.1 |
| 6,577,723 B1 | * | 6/2003 | Mooney | 379/221.08 |

FOREIGN PATENT DOCUMENTS

| | | |
|---|---|---|
| WO | WO 96/25830 | 8/1996 |
| WO | WO 98/06226 | 2/1998 |
| WO | WO 98/36590 | 8/1998 |
| WO | WO 99/66749 | 12/1999 |

OTHER PUBLICATIONS

Standard Search Report for RS 106257US Completed Jul. 18, 2001.

* cited by examiner

*Primary Examiner*—Erika Gary
*Assistant Examiner*—Temica M. Davis

(57) ABSTRACT

The present invention comprises a system and method for positioning a mobile station within an AMPS/TDMA system. Upon receipt of a positioning request for the mobile station at a positioning node, a positioning request indicator is transmitted to an MSC of the mobile station within a first group of ANSI-41 messages. The positioning data is determined for the mobile station responsive to the positioning request indicator and transmitted back to the positioning node using a second group of ANSI-41 messages.

21 Claims, 3 Drawing Sheets

MOBILE POSITIONING WITHIN AN AMPS/TDMA SYSTEM

BACKGROUND OF THE INVENTION

1. Technical Field of the Invention

The present invention relates to mobile positioning systems, and more particularly, to a system for positioning a mobile station within an existing infrastructure of an AMPS/TDMA system.

2. Description of Related Art

Mobile positioning for location based services has become a very desirable feature for many mobile operators. Mobile positioning enables positioning measurements to be made upon a mobile station wherein the position is based upon the cell/sector ID in which the mobile station presently resides and optionally upon a time alignment value. Positioning by this method provides very coarse values but is sufficient for providing information upon services which may be located near a mobile station's general position, for example, locations of gas stations, restaurants, grocery stores, etc. This type of coarse positioning may also be sufficiently accurate for services wherein the cell/sector areas in which the mobile station is presently located are sufficiently small.

Currently, mobile positioning based upon the cell/sector ID of a mobile station is only available to GSM customers. This service is not available to AMPS/TDMA customers. A mobile positioning system utilized within a GSM system handles a positioning request similarly to a mobile terminated SMS message. The MSC serving the mobile terminal acts as if an incoming positioning request message is a standard mobile terminated SMS (MT-SMS) message, even though the message has nothing to do with SMS. The positioning request and results of the positioning request are transmitted within the GSM network using MAP (mobile application part) messages.

Unfortunately, the mobile positioning solution utilized within a GSM system is not valid within an AMPS/TDMA system due to the technical differences in the mobile architectures. For example, ETSI-MAP signaling is not available within AMPS/TDMA. The AMPS/TDMA system instead uses ANSI-41 signaling. A proprietary signaling scheme similar to that utilized within GSM might be introduced with AMPS/TDMA, however, this would require the mobile positioning center (MPC), mobile switching center (MSC) and home location register (HLR) to be modified in order to understand the newly created signaling messages. Since the HLRs within many AMPS/TDMA systems are provided by a number of different vendors, this would require major reconfiguration compability problems for a mobile network operator.

Furthermore, in order for an AMPS/TDMA system to handle a positioning request in a similar manner as a mobile terminated SMS message within a GSM system, the mobile station identifier which is a unique identifier associated with the mobile station must be made available. However, within an AMPS/TDMA system, when a positioning request comes from a positioning client or application, only the mobile destination number (MDN) (the number dialed when a user is making a call) is known and a solution implemented in a manner similar to a GSM system is not possible. Therefore, some system and method for enabling mobile positioning within the existing the AMPS/TDMA system infrastructure is desired.

SUMMARY OF THE INVENTION

The present invention overcomes the foregoing and other problems with a system and method for positioning a mobile station within an AMPS/TDMA system. A positioning node receives a positioning request for a particular mobile station. In response to this positioning request, the positioning node forwards a positioning request identifier to an HLR of the mobile station within a LOCREQ INVOKE message. The HLR forwards the positioning request indicator from the HLR to an MSC of the mobile station within a ROUTEREQ INVOKE message.

In response to the positioning request indicator received at the MSC, positioning data for the mobile station is obtained. This positioning data is forwarded from the MSC back to the HLR within a ROUTEREQ RESPONSE message, and the positioning data is forwarded on to the positioning node from the HLR within a LOCREQ RESPONSE message. The positioning request may then be responded to by the positioning node.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
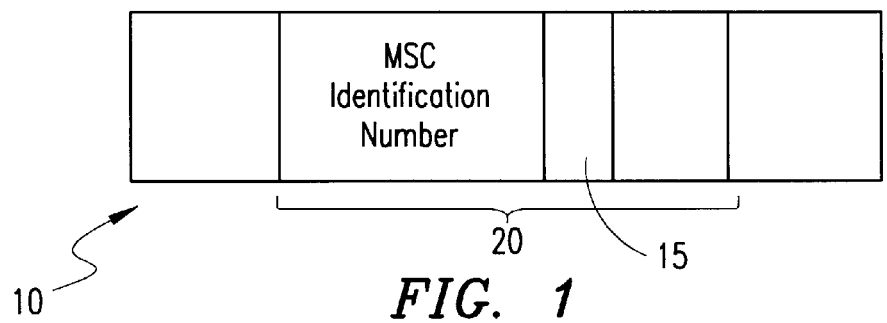
FIG. 1 is an illustration of a LOCREQ/ROUTEREQ INVOKE message including a positioning request flag.

Referring now to the drawings, and more particularly to FIG. 1, there is illustrated a modified LOCREQ/ROUTEREQ INVOKE message 10. The LOCREQ INVOKE message is used by an originating MSC to obtain call treatment instructions from the HLR of a mobile subscriber when a call is transmitted to a mobile subscriber. The LOCREQ INVOKE message is transmitted to a mobile station's HLR during a call set-up process. The ROUTEREQ INVOKE message is used to inquire as to a preferred method of routing a pending call to an identified mobile station. It is normally transmitted from an MSC to the HLR of a mobile station.

While the LOCREQ and ROUTEREQ INVOKE messages comprise two separate kinds of messages within the present invention, the messages are modified in the same manner in order to accommodate a positioning request within the existing AMPS/TDMA infrastructure. The LOCREQ/ROUTEREQ INVOKE message 10 is modified by embedding a positioning request indicator within the message 10. The message 10 is created by placing a positioning request flag 15 within the TDMA service code 20. Placement of the positioning request flag 15 within the TDMA service code 20 is only one example of a preferred embodiment, and any other suitable parameter within the LOCREQ/ROUTEREQ INVOKE message 10 may be similarly utilized.

Figure 2:
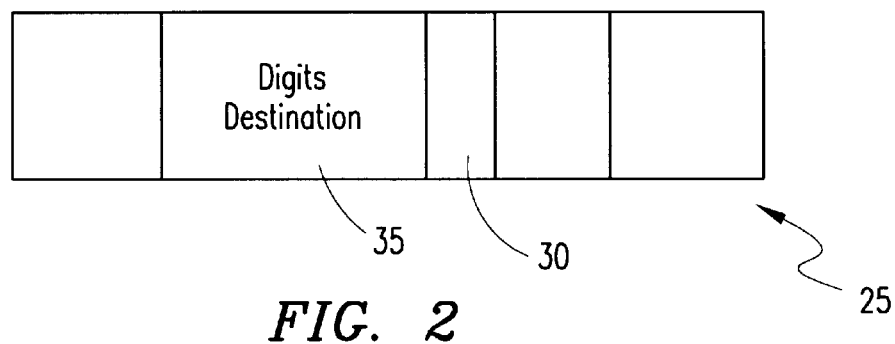
FIG. 2 illustrates a LOCREQ/ROUTEREQ RESULT message including a provided positioning data result.

Referring now to FIG. 2, there is illustrated the LOCREQ/ROUTEREQ RESPONSE messages 25. The LOCREQ RESPONSE message is transmitted from the HLR to the originating MSC, and the ROUTEREQ RESPONSE message is transmitted from the subscriber MSC to the HLR. These messages 25 are modified by embedding the positioning data 30, consisting of the cell/sector IDs and a time alignment value, if applicable, within the Digit's (Destination) Parameter 35. As with the LOCREQ/ROUTEREQ INVOKE message 10, the positioning data 30 may be embedded in any other suitable parameter other than the Digit's (Destination) Parameter 35.

Figure 3:
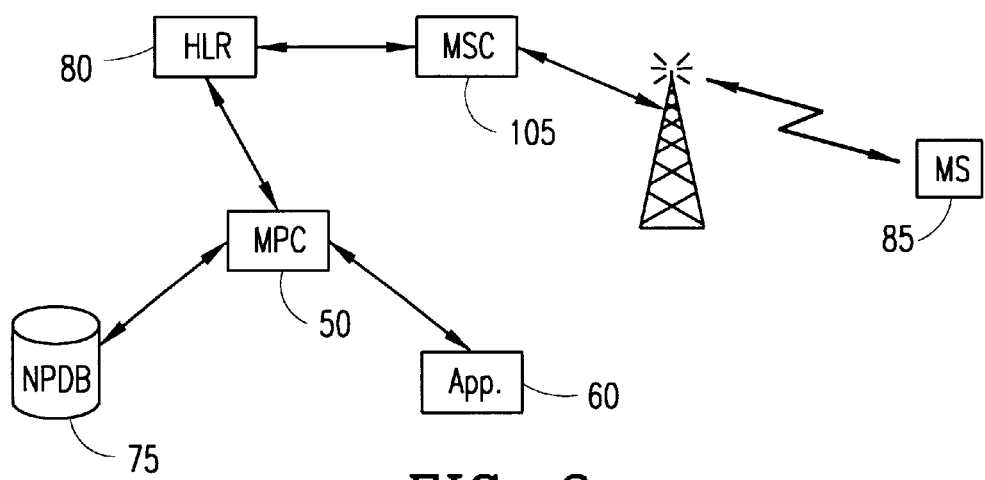
FIG. 3 is a block diagram illustrating a first embodiment of a mobile positioning system within an AMPS/TDMA system.
Figures 4, 6:
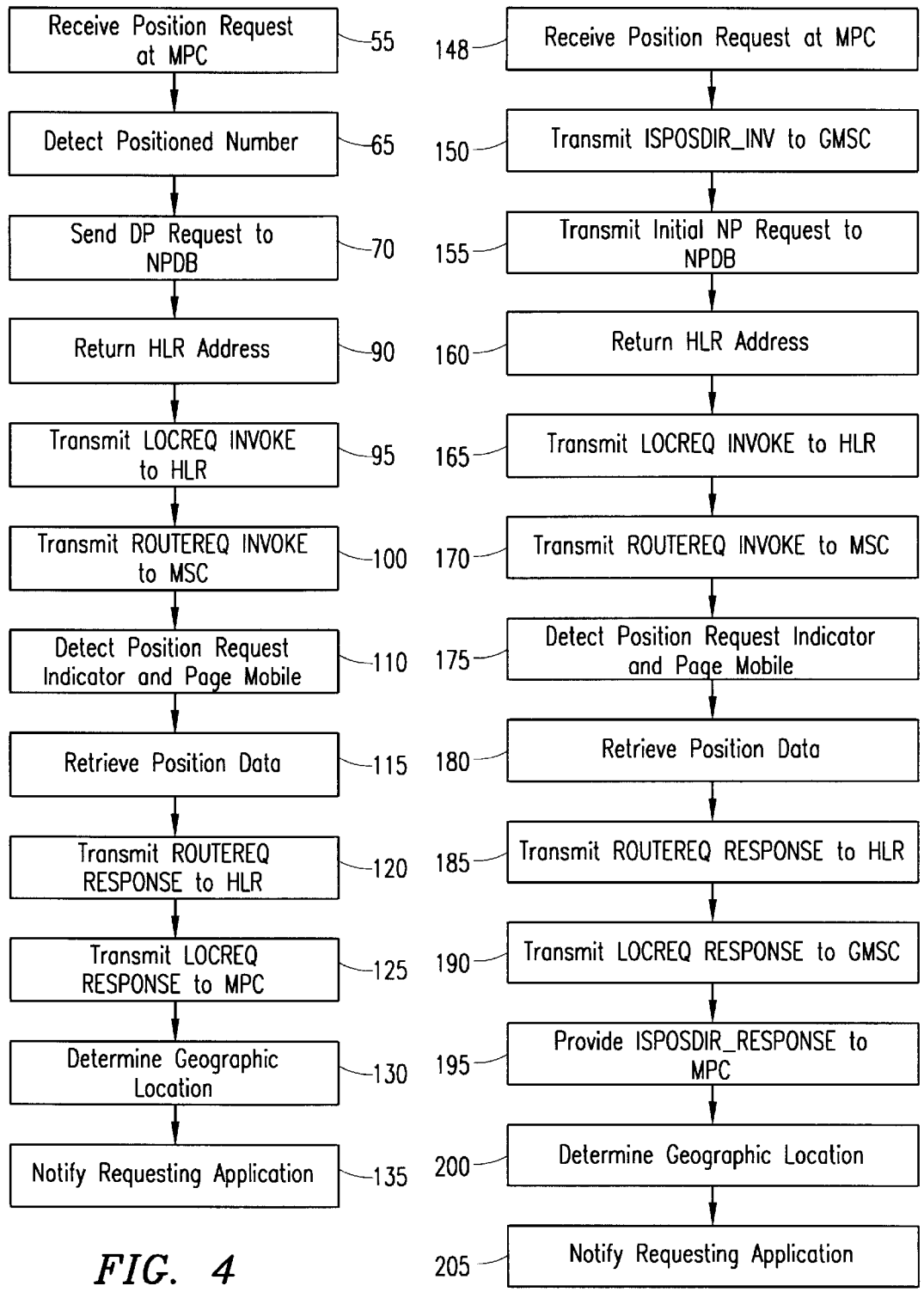
FIG. 4 is a flow diagram illustrating the operation of the mobile positioning system described in FIG. 3.
FIG. 6 is a flow diagram illustrating a mobile positioning process using the embodiment illustrated in FIG. 5.

Referring now to FIGS. 3 and 4, there are illustrated a first exemplary embodiment of an AMPS/TDMA system performing a mobile positioning according to the present invention, and a flow chart of the process for performing the mobile positioning, respectively. Initially, the mobile positioning center (MPC) 50, which is responsible for coordinating a positioning request and calculating a position in terms of latitude, longitude, inner radius, outer radius, and start and stop angles based upon a received cell and sector ID and time alignment, receives a positioning request at step 55 from an application 60 through an HTTP interface using standard mobile position protocol. The MPC 50 detects at step 65 that a position number associated with the received positioning request is within a portable number series and sends at step 70 an initial NP request to a number portability database (NPDB) 75 (Alternatively, if the MS is in a number range with number portability, a default HLR is chosen.). A portable number series is a range of numbers where portability of numbers can be accomplished. The number portability database 75 has nothing specifically to do with the positioning but is necessary (if the number is within a portable number series) in order to attain the address of the HLR 80 for the mobile station 85 which is being positioned. The address of the HLR is returned at step 90, and the MPC 50 transmits a LOCREQ INVOKE message to the HLR 80 including a positioning request indicator for the mobile station 85 at step 95.

Upon receipt of the LOCREQ INVOKE message, the HLR 80 handles the message as a normal call set-up message and forwards a ROUTEREQ INVOKE message at step 100 to the MSC 105 presently serving the mobile station 85. As described previously, the ROUTEREQ INVOKE message includes the embedded positioning request flag. The MSC 105 detects the embedded positioning request flag within the LOCREQ/ROUTEREQ INVOKE message and pages the mobile station 85 at step 110. The MSC 105 receives at step 115 the positioning data from the mobile station 85. The positioning data includes the cell/sector ID and possibly a time alignment value.

The MSC 105 transmits a ROUTEREQ RESPONSE message including the positioning data at step 120 back to the HLR 80. The HLR forwards at step 125 the positioning data to the MPC 50 within a LOCREQ RESPONSE message. The MPC 50 utilizes the positioning data within the LOCREQ RESPONSE message to determine at step 130 a geographic location of the mobile station 85. It does this by converting the received cell/sector identifications (and possibly the time alignment value) into longitude and latitude information. The MPC 50 transmits at step 135 a response to the requesting application 60 notifying it of the geographic position of the mobile station 85.

Figure 5:
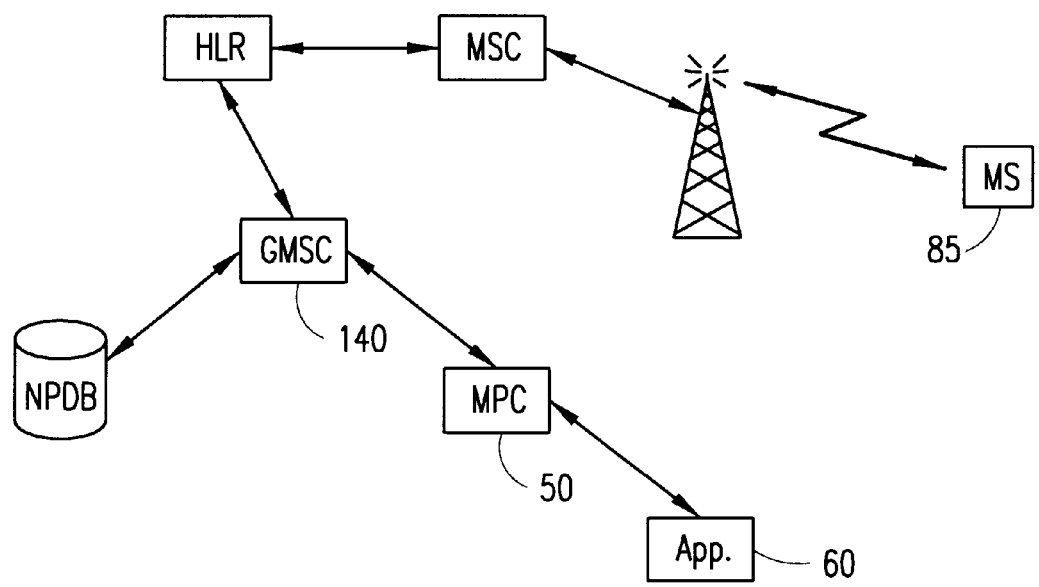
FIG. 5 is an illustration of a second embodiment of a mobile positioning system within an AMPS/TDMA system.

Referring now to FIGS. 5 and 6, there is illustrated a second embodiment of the present invention. Like reference numbers are utilized for similar components within FIG. 5. The MPC 50 receives a request at step 148 from application 60 and sends at step 150 an INTERSYSTEM POSITION DIRECTIVE INVOKE message (ISPOSDIR_INV) to a Mobile Switching Center (GMSC) 140 requesting a position of the mobile station 85. The GMSC 140 determines that the position number is within a portable number series and transmits at step 155 an initial NP request to the number portable database (NPDB) 75. The NPDB 75 returns the HLR address at step 160 (if the number is within a portable number series), and the GMSC 140 transmits a LOCREQ INVOKE message including an embedded positioning request indicator to the HLR 80 at step 165.

Upon receipt of the LOCREQ INVOKE message, the HLR 80 handles the message as a normal call set-up message and forwards a ROUTEREQ INVOKE message at step 170 to the MSC 105 presently serving the mobile station 85. As described previously, the ROUTEREQ INVOKE message includes the embedded positioning request flag. The MSC 105 detects the embedded positioning request flag within the ROUTEREQ INVOKE message and pages the mobile station 85 at step 175. The MSC 105 receives at step 180 the positioning data from the mobile station 85. The positioning data includes the cell/sector ID of where the mobile station 85 is located and possible a time alignment value.

The MSC 105 transmits a ROUTEREQ RESPONSE message at step 185 back to the HLR 80. The ROUTEREQ RESPONSE message includes the positioning data. The HLR forwards at step 190 the positioning data to the GMSC 140 within a LOCREQ RESPONSE message. The GMSC 140 returns at step 195 an ISPOSDIR_RESPONSE message including the cell/sector ID information within the position data to the MPC 50. The MPC 50 utilizes the positioning data to determine at step 200 a geographic location of the mobile station 85. It does this by converting the received cell/sector identifications (and possibly the time alignment) into longitude and latitude information. The MPC 50 transmits at step 205 a response to the requesting application notifying it of the geographic position of the mobile station 85.

The above described system and method enable positioning information to be obtained from a mobile station 85 without requiring any new ANSI-41 messages to be introduced within the communications between the MPC 50 and the mobile network. Furthermore, no major changes are required to the existing AMPS/TDMA infrastructure.

The previous description is of a preferred embodiment for implementing the invention, and the scope of the invention should not necessarily be limited by this description. The scope of the present invention is instead defined by the following claims.

What is claimed is:

1. A method for positioning a mobile station within a telecommunications system, comprising the steps of:
   receiving a positioning request for the mobile station at a positioning node;
   obtaining an address of an HLR of the mobile station wherein said step of obtaining further comprises the steps of:
      transmitting a request for the address of the HLR from the positioning node to a number portability database; and
      receiving the address of the HLR at the positioning node from the number portability database;
   transmitting a positioning request indicator using a first group of ANSI-41 messages from the positioning node to an MSC of the mobile station;
   obtaining positioning data for the mobile station;
   transmitting the positioning data from the MSC to the positioning node using a second group of ANSI-41 messages; and
   responding to the positioning request.

2. The method of claim 1, wherein the step of transmitting the positioning request indicator further comprises the steps of:
forwarding the positioning request indicator from the positioning node to an HLR of the mobile station in a first ANSI-41 message; and
forwarding the positioning request indicator to the MSC of the mobile station in a second ANSl-41 message.

3. The method of claim 1, wherein the step of transmitting the positioning data further comprises the steps of:
forwarding the positioning data to an HLR of the mobile station in a third ANSI-41 message; and
forwarding the positioning data from the HIR to the positioning node in a fourth ANSI-41 message.

4. The method of claim 1, wherein the step of responding further comprises the step of:
converting the positioning data into geographic position data; and
forwarding the geographic position data to an entity generating the positioning request.

5. The method of claim 1, wherein the step of obtaining the address further comprises the steps of;
requesting a position of the mobile station from a mobile switching center;
transmitting a request for the address of the HLR from the mobile switching center to a number portability database; and
receiving the address of the HLR at the mobile switching center from the number portability database.

6. A method for positioning a mobile station within a telecommunications system, comprising the steps of:
receiving a positioning request for the mobile station at a positioning node;
forwarding a positioning request indicator to an HLR of the mobile station in a LOCREQ INVOKE message, wherein said positioning request indicator is included within an MSC identification number parameter of the LOCREQ INVOKE message;
forwarding the positioning request indicator from the HLR to an MSC of the mobile station in a ROUTEREQ INVOKE message;
obtaining positioning data for the mobile station;
forwarding the positioning data from the MSC to the HLR in a ROUTEREQ RESPONSE message;
forwarding the positioning data from the HLR to the positioning node using at least a LOCREQ RESPONSE message; and
responding to the positioning request.

7. The method of claim 6, wherein the step of responding further comprises the step of:
converting the positioning data into geographic position data; and
forwarding the geographic position data to an entity generating the positioning request.

8. The method of claim 6, further including the step of obtaining an address of an HLR of the mobile station.

9. The method of claim 8, wherein the step of obtaining the address further comprises the steps of:
transmitting a request for the address of the HLR from the positioning node to a number portability database; and
receiving the address of the HLR at the positioning node from the number portability database.

10. The method of claim 8, wherein the step of obtaining the address further comprises the steps of:
requesting a position of the mobile station from a mobile switching center;
transmitting a request for the address of the HLR from the mobile switching center node to a number portability database; and
receiving the address of the HLR at the mobile switching center from the number portability database.

11. The method of claim 6, wherein the step of forwarding the positioning request indicator to the MSC further includes the step of forwarding the positioning request indicator within an MSC identification number parameter of the ROUTEREQ INVOKE message.

12. The method of claim 6, wherein the step of forwarding the positioning data to the HLR further includes the step of forwarding the positioning data to the HLR embedded within a Digits parameter of the ROUTEREQ RESPONSE message.

13. The method of claim 6, wherein the step of forwarding the positioning data to the positioning node further includes the step of forwarding the positioning data to the positioning node embedded within a Digits parameter of the LOCREQ RESPONSE message.

14. The method of claim 6, wherein the positioning request indicator comprises a set flag.

15. The method of claim 6, wherein the positioning data comprises at least a cell/sector ID.

16. The method of claim 15, wherein the positioning data further comprises a time alignment value.

17. A system for positioning a mobile station, comprising:
a positioning node responsive to a received positioning request for generating a LOCREQ INVOKE message including a positioning request indicator and for receiving positioning data in a LOCREQ RESPONSE message;
an MSC responsive to receipt of the positioning data for generating a ROUTEREQ RESPONSE message including the positioning data and for receiving the positioning request indicator in a ROUTEREQ INVOKE message; and
an HLR for generating the ROUTEREQ INVOKE message including the positioning request indicator responsive to the LOCREQ INVOKE message and for generating the LOCREQ RESPONSE message including the positioning data responsive to the ROUTEREQ RESPONSE message wherein the positioning response indicator in the LOCREQ INVOKE and the ROUTEREQ INVOKE messages are stored in a MSC Identification Number parameter.

18. The system of claim 17, wherein the positioning data in the LOCREQ RESPONSE and the ROUTEREQ RESPONSE messages are stored in a Digits parameter.

19. The system of claim 17, wherein the positioning request indicator comprises a set flag.

20. The system of claim 17, wherein the positioning data comprises at least a cell/sector ID.

21. The system of claim 20, wherein the positioning data further comprises a time alignment value.

* * * * *